United States Patent

Sandaluk

[19]

[11] Patent Number: 5,990,929
[45] Date of Patent: Nov. 23, 1999

[54] RETURN AMPLIFIER FOR TWO WAY CABLE TRANSMISSION AND METHOD

[76] Inventor: Anthony J. Sandaluk, 101 Subway Crescent, PH 303, Toronto, Canada, M9C 6K4

[21] Appl. No.: 09/134,514

[22] Filed: Aug. 14, 1998

[51] Int. Cl.⁶ .................................................. H04N 7/173
[52] U.S. Cl. ............................................ 348/12; 455/5.1
[58] Field of Search ............................ 455/3.1, 5.1, 6.1; 348/6, 12, 13; 375/229, 230, 257; 333/18 R, 28 R

*Primary Examiner*—Andrew I. Faile
*Assistant Examiner*—Sam Huang

[57] ABSTRACT

A return amplifier for two-way coaxial cable systems, of the type having a distribution centre distributing first feed signals, and a separate second signal delivery system having facilities for distributing second feed signals onto said cable system and reception facilities for receiving return signals from said cable system, the system having feeder amplifiers for receiving first and second feed signals, and having return amplifiers having a standard amplifier assembly having a plurality of electronic circuits, and in which first and second said electronic circuits are settable to provide varying return amplifier specifications, and each of said first and second circuits having receptacles for receiving plug in attenuator components for varying the specifications of the return amplifier, the plurality of plug in attenuator components each being of identical design and being adapted to interfit with either the first or second electronic circuit, and the attenuator components having a range of varying performance characteristics so that an attenuator component can be selected and plugged in to respective ones of the first and second electronic circuits to produce the performance specifications desired for the return amplifier at a predetermined location in the cable system, and to a method of operating a return amplifier of the type described.

12 Claims, 3 Drawing Sheets

RETURN AMPLIFIER FOR TWO WAY CABLE TRANSMISSION AND METHOD

FIELD OF THE INVENTION

The invention relates to a return amplifier for use on a coaxial cable transmission system, for amplifying the return signals carried on such system, and to such a return amplifier having plug in attenuator components for presetting the performance characteristics of the amplifier to a particular location on the cable system.

BACKGROUND OF THE INVENTION

It is well known practice to transmit signals in two directions, along a common electrical wire transmitting system, a typical example being a telephone system. Telephone wire transmission systems are well known for transmitting voice transmissions and also for transmitting electronically generated signals from a wide variety of equipment such as security systems, facsimile machines, and a wide variety of computer information for example, coded signals concerning credit transactions, and transferring information to and from computers connected to the telephone wire system. Due to the nature of the telephone wire transmission systems, there are significant restrictions on the speed, and volume, of information which can be transmitted within a given time span. In the past this has not been a significant problem. However, with the ever increasing popularity of the so called "Internet", the ability to transmit very large volumes of information at high speed in both directions has become critical. The telephone wire transmission system does not readily accommodate itself to the very substantial expansion of the volume of information as well as the increase in speed of transmission that is required to satisfy the growing number of customers requiring Internet services. As a result, Internet servicing companies are seeking alternative means of transmission.

Telephone wire transmission systems are also subject to intermittent interference from a variety of sources, and are sometimes simply so overloaded that they are incapable of accepting further transmissions.

Coaxial cable transmission networks for distributing cable television services are becoming widely accepted in many cities and towns, and provide excellent services for distributing television signals to television sets of subscribers on the network. Such cable television distribution systems are based on a coaxial wire cable, having a single central conductive core, and a woven sheath of wire or other form of conductive sheath, insulated from the core. Such coaxial cable is capable of transmitting much greater volumes of information at high speed, and with very little interference. In the past such cable systems have been used for one way transmission of television signals from the head end signal source to the consumers television sets.

The existence of wide spread cable television signal networks has lead to the development of their use as a means of connecting consumers to the Internet system. The coaxial cable systems, with feed signal amplifiers located along the cables at spaced intervals, and with their substantial freedom from interference, lend themselves particularly well to the rapid transmission of high volume signals such as are generated by the Internet system. Consequently consumers are increasingly looking to the coaxial cable television networks as a means of connecting their computers to the Internet, so as to avoid the difficulties of connections via the telephone wire systems.

However, one of the problems encountered in using coaxial cable networks for distribution of Internet signals is that the cables are required to carry signals in both directions simultaneously. Thus the consumer will wish to be receiving signals from an Internet source, and will wish to be generating return signals, generated from his or her computer, back onto to the Internet. In theory the coaxial cable networks are ideally suited to this type of two-way transmission. In practice however, there are problems which arise from the original design of such cable systems. Since the coaxial cable networks are relatively long, the feed signals on the networks gradually become attenuated and decrease in strength as they pass along the length of the cable. In the case of television feed signals this problem is overcome, as mentioned above, by the use of feed signal amplifiers located in the coaxial cables at spaced intervals. These feed signal amplifiers ensure that all subscribers on any particular cable network will receive television signals (and Internet signals) of adequate strength, and they will also amplify the Internet feed signals, so that in spite of the considerable length of any one particular cable, the feed signals will all be substantially of the same signal strength to all households on that cable network.

However, such feed signal amplifiers are capable only of amplifying the feed signals fed into the coaxial cable from the head end where the television and Internet signals originate, and cannot amplify return signals, passing in the opposite direction.

As a result, when it is attempted to adapt or modify the coaxial cable system for two-way transmission, the return signals are unable to pass through the feed amplifiers already incorporated in the network. Return signal amplifiers have been used to amplify the return signals, and these return signal amplifiers are located alongside the feed amplifiers on the cable network and pass the return signals around the feed amplifiers, and increase the return signal strength. In this way the return signals bypass the feed signal amplifiers, and at the same time their signal strength is maintained at the desired level so that it can be fed back to the Internet server.

The problem of signal strength is aggravated by the fact that the attenuation of signal strength is greater in the higher range of frequencies, and is lower in the lower range of frequencies. The feed amplifiers in use on cable systems are already designed to overcome these problems, and equalise the signal strength over the entire frequency band of the feed signals. However, the adaptation of an existing one way cable network to accept return signals such as Internet signals requires that the return amplifiers be installed on the already existing cable network.

The return amplifiers designed for maintaining signal strength of the return signals must be designed so as to amplify the signals over the entire frequency range of the return signals back up to a uniform level of signal strength, across the entire range of frequency. However the signal strength of the return signals at any given location on an existing cable network can only be determined by actually measuring the return signals at that location. This signal strength will vary from one location to another. Consequently the return amplifier cannot be produced as a standard item, but must have performance characteristics which vary from one cable location to another.

Typically, the return frequency signals will be in the range of from about 5 to 42 megahertz. If the amplification of the signals does not produce a uniform signal strength over this entire range then the signals received back at the origin of the feed signals, i.e. the Internet server, will be distorted.

Another problem in the design and construction of such return signal amplifiers is the fact that return amplifiers will be required at spaced locations along any given length of coaxial cable in the system. These locations will correspond to the locations of the already installed feed signal amplifiers. Return amplifiers with standard characteristics will not be equally suitable at each location. In fact, it will be found that before a return amplifier is installed by the installer, the return signal strength at that location must be tested and a return amplifier must be installed having the correct amplifying characteristics for that particular location in the coaxial cable network. These specifications will vary from one return amplifier location to another along any given length of the coaxial cable.

In theory it is perfectly possible to manufacture a whole range of return amplifiers having a range of different performance characteristics. A coaxial line crew could carry a large supply of such return amplifiers with them, and after testing and checking the signal strength at a particular location, could then select and insert the appropriate return amplifier having the correct specifications for that location. In practice however this is not possible, since it will require a very large investment for supplying an adequate inventory of return amplifiers covering a full range of characteristics, to each particular line crew. In addition, transporting such a large inventory of return amplifiers covering a wide range of different characteristics, presents a problem of transporting a large number of bulky and relatively heavy objects.

A further problem is the fact that the line crew will be required to climb up to the coaxial cable and then check the signal strength and then come down and select the appropriate return amplifier and then climb back up again and insert it.

For all of these reasons, providing an adequate number of return amplifiers having ranges of different characteristics to meet all conditions and requirements on a given coaxial cable network becomes a logistical nightmare, and a severe financial strain, and causes much undesirable additional labour.

For all of these reasons therefore it is desirable to provide a uniform standardized return amplifier circuit, contained in a standardized return amplifier housing, and having a plurality of plug-in components, which can simply be carried in the personal equipment of the lines person. After climbing up to the cable the lines person can simply attach and connect the standardized return amplifier, and then test the signal strength and characteristics and then insert the appropriate plug-in components to produce a return amplifier having the necessary characteristics for that particular location in the system.

This problem is further complicated by the fact that return amplifiers have two separate circuit components that must be preset for any particular location. It is desirable that both of these circuits can be arranged to receive plug in sub components, which have the effect of presetting the characteristics of that amplifier. It is still further desirable that these plug in components shall be interchangeable as between the two circuits. In this way a lines person will be required to carry only one type of plug in component, in an adequate range of performance characteristics, so that when the signal strength has been measured at that location, the return amplifier can readily be set to the correct performance, by simply selecting the plug in components having the correct values for the two circuits.

This greatly reduces the requirement for carrying a large inventory of different return amplifiers and greatly reduces the financial burden of carrying such an inventory and also reduces the logistical problems and the time consuming effort by the lines crew of checking signal strength and then attaching the correct return amplifier.

BRIEF SUMMARY OF THE INVENTION

With a view to achieving improvements in return amplifiers for two-way coaxial cable lines, of the type having a transmission centre, and a plurality of coaxial cable lines extending therefrom, and a plurality of tap ports connecting signals from the coaxial cable line to respective terminals, and said coaxial cable system further having a separate signal distribution system having facilities for distributing feeder signals onto said cable system and reception facilities for receiving return signals from said cable system, and wherein feeder signals and return signals passing along said cable system in opposite directions are progressively attenuated in signal strength, said system having feeder amplifiers at spaced intervals therealong, for receiving feed signals passing along said coaxial cables, and amplifying the same, the invention provides a return amplifier having a standard amplifier assembly having a plurality of electronic circuits, and in which first and second said amplifier circuits are settable to provide varying amplifier specifications, and each of said first and second circuits having receptacles for receiving plug in circuit components for varying said specifications, of respective said first and second circuits, and a plurality of plug in circuit components, each being of identical design and being adapted to interfit with either said first or said second circuit, and said components having a rang of varying performance characteristics whereby a respective said component can be selected and plugged in to each of said first and second circuits to produce the performance specifications desired for the return amplifier at a predetermined location.

It is a further related objective of the invention to provide such a return amplifier and in which the amplifier incorporates an equalizer circuit, said equalizer circuit being adapted to receive one of a plurality of attenuator components having characteristics which are predetermined, whereby the characteristics of said amplifier can be adjusted, by interchanging said attenuator in said equalizer circuit.

The invention further contemplates the provision of such a return amplifier having a return signal attenuator component, and having a plurality of interchangeable attenuator components having predetermined characteristics, whereby a service person may install such a return amplifier, and may set its predetermined characteristics, by inserting components having the respective characteristics required for that particular location of that particular return amplifier.

The invention further contemplates that the return amplifier shall incorporate a PAD circuit adapted to receive one of a group of plug in attenuator components, wherein the plug in attenuator components for the equaliser circuit, and for the PAD circuit, shall all be of the identical design, and shall be interchangeable between the two circuits.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

FIG. 1A shows a portion of one dwelling greatly enlarged and cut away for the purposes of explanation and clarity;

DESCRIPTION OF A SPECIFIC EMBODIMENT

Figure 1:
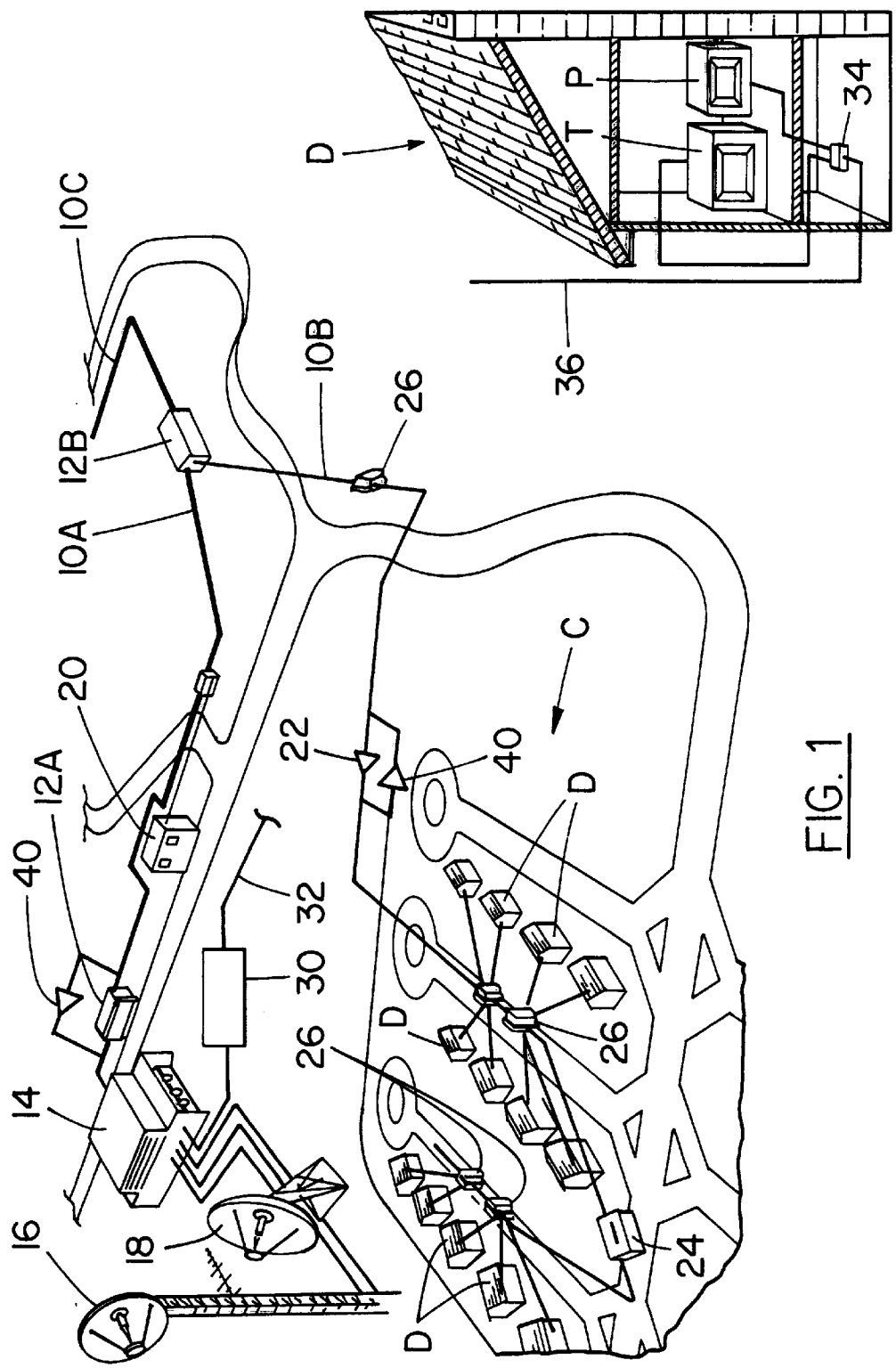
FIG. 1 is a schematic perspective illustration of a portion of a community coaxial cable signal distribution system.

Referring first of all to FIG. 1, it will be seen that is what represented there is a community indicated generally as C, consisting of a plurality of dwellings indicated as D, and one of the dwellings indicated as D being greatly enlarged and partially cut away.

Within the cut away enlarged dwelling D it will be seen that the dwelling is provided with a television receiver indicated as T, and a typical personal computer indicated as P.

It will of course be appreciated that the dwellings, television and personal computer do not form any part of the invention, and are merely represented schematically for the sake of explaining the utility of the invention.

A coaxial cable distribution line is indicated generally as 10A. It is supplied through a main station 12A, from a head end supply installation 14 with first feed signals, in this case television signals. Further main stations 12B and so on may be located at spaced intervals along the cable 10A, allowing branch cables indicated for example as 10B and 10C to be connected to the main cable 10A.

The head end installation 14 in this particular case is shown supplied with VHF signals through a VHF microwave antenna 16. A television satellite antenna 18 may also be connected to the head end 14. Typically the microwave antenna 16 will be arranged and focussed on a microwave transmitter at a distance across country, and will receive focussed television signals from the microwave transmitter station (not shown) the details of such systems being well-known by persons skilled in the art.

The satellite antenna 18 will similarly be focussed a television transmission satellite, such as is well-known in the art, located in fixed orbit above the earth, so that television signals may be received at the satellite antenna 18 from such a satellite (not shown). All of such signals may be processed in the head end installation 14, and distributed along the cable system 10A, 10B, 10C and so on throughout the community.

In accordance with well-known practice, the cable system 10A, 10B and 10C is provided with a power supply indicated generally as 20, to supply power to the cable system.

At various locations along the cable system there will be located feeder amplifiers indicated generally as 22. The feeder amplifiers 22 amplify the feed signal in a such a manner as to amplify and equalize the levels of the various frequencies, so that all of the consumers indicated by the dwellings D will receive the signals of adequate signal strength and which signals are substantially equalized across the bandwidth of the feeder signal. Optionally one or more line extenders 24 may be included which essentially provide the same function as the feeder amplifiers 22.

In this way, the level of the feed signal over the entire network of coaxial cables 10A, 10B, 10C and so on is substantially equalized to a stable level, across the entire frequency band being distributed, so as to ensure that every subscriber receives a satisfactory adequate signal.

Up to this point, what has been described is essentially a standard state of the art cable television distribution network, in which television feed signals are simply received and processed at a head end 14 and are distributed as feed signals down the coaxial cable system to the various subscribers indicated in this case as D.

It will of course be appreciated that the subscribers are not necessarily represented as dwellings, but may be any number of different types of outlets or institutions that may be connected by cable.

At various locations along the cable system there are located subscriber cable connections known as tap ports indicated generally as 26. There may be one tap port for each subscriber or there may be a plurality of subscribers connected to a single tap port, depending upon the design of the system, all of which is well-known in the art.

In addition however to distributing television signals, the cable system as illustrated is also used for distributing two-way signals. The two-way signals consist in this case of second feed signals supplied from an Internet server indicated generally as 30, and return signals generated by individual subscribers. The Internet server 30 is connected by any suitable Internet connecting line indicated as 32.

As explained above, the coaxial cable system is capable of carrying Internet signals which are at frequencies separated from the frequency ranges of various television channels, and the coaxial cable system is also capable of carrying return Internet signals, which will consist of signals developed by individual Internet subscribers in their own personal computers. The Internet system connected to individual subscribers having personal computers is itself well-known, and as mentioned above, is usually connected through telephone cable systems to individual dwellings or subscribers at various locations or in businesses.

Also as mentioned above, the use of the coaxial cable television network as a means for distributing and returning Internet signals has numerous advantages as compared with using the telephone wire distribution system.

Once the Internet servers signals are connected to the header installation 14, they are distributed as second feed signals down the coaxial cable system 10A, 10B and 10C, and can be received by subscribers having appropriate equipment. Thus in the cut away dwelling D, a signal splitter 34 is shown receiving signals from the coaxial cable system, and distributing them to the television T on the one hand and to the personal computer P on the other hand.

The splitter 34 will operate so as to separate the television frequency signals on the coaxial cable system, from the Internet signals on the coaxial cable system. Each dwelling is connected from a tap port 26, by means of a connector cable 36.

It will of course be understood that not all of the dwellings D will be provided with a splitter 34, since not all of the dwellings D will in fact be customers of the Internet server 30.

In the case of those dwellings d which are not customers of the Internet server 30, then the cable connector 36 will feed directly into the television set. Alternatively, it may feed through a conventional television cable splitter (not shown) into two or more television sets in the same dwelling in a well known manner.

As has already been explained, the Internet system involves the use of two-way signals, so that the Internet server will feed Internet signals onto the cable system, to the various subscribers at their personal computers P. The personal computers P will in turn operate to send return signals back up the cable system to the Internet server.

In order to ensure that these return Internet signals on the coaxial system bypass the feed amplifiers and are maintained at an appropriate signal strength, return amplifiers indicated generally as 40 are provided at various locations, corresponding to the locations of the feed amplifiers along the cable system. The effect of these return amplifiers 40 is to accept the return signals generated at the various personal computers P of the individual subscribers, and to amplify them and to ensure that the signal strength of the return signals at the various frequencies across the bandwidth are maintained at appropriate signal strength levels, so that when they reach the Internet server 30 and go back onto the Internet via the cable 32, the return signals are at a level adequate to carry appropriate information back onto the Internet.

As already explained above, one of the problems in the design of such amplifiers is to ensure that they are effective to amplify the various different frequency signals up to a signal level which is equalized across the signal frequency band. As mentioned typically this is as wide as from 5 to 42 mhz, so that the attenuation of signals across the frequency band can be a serious problem.

Figure 2:
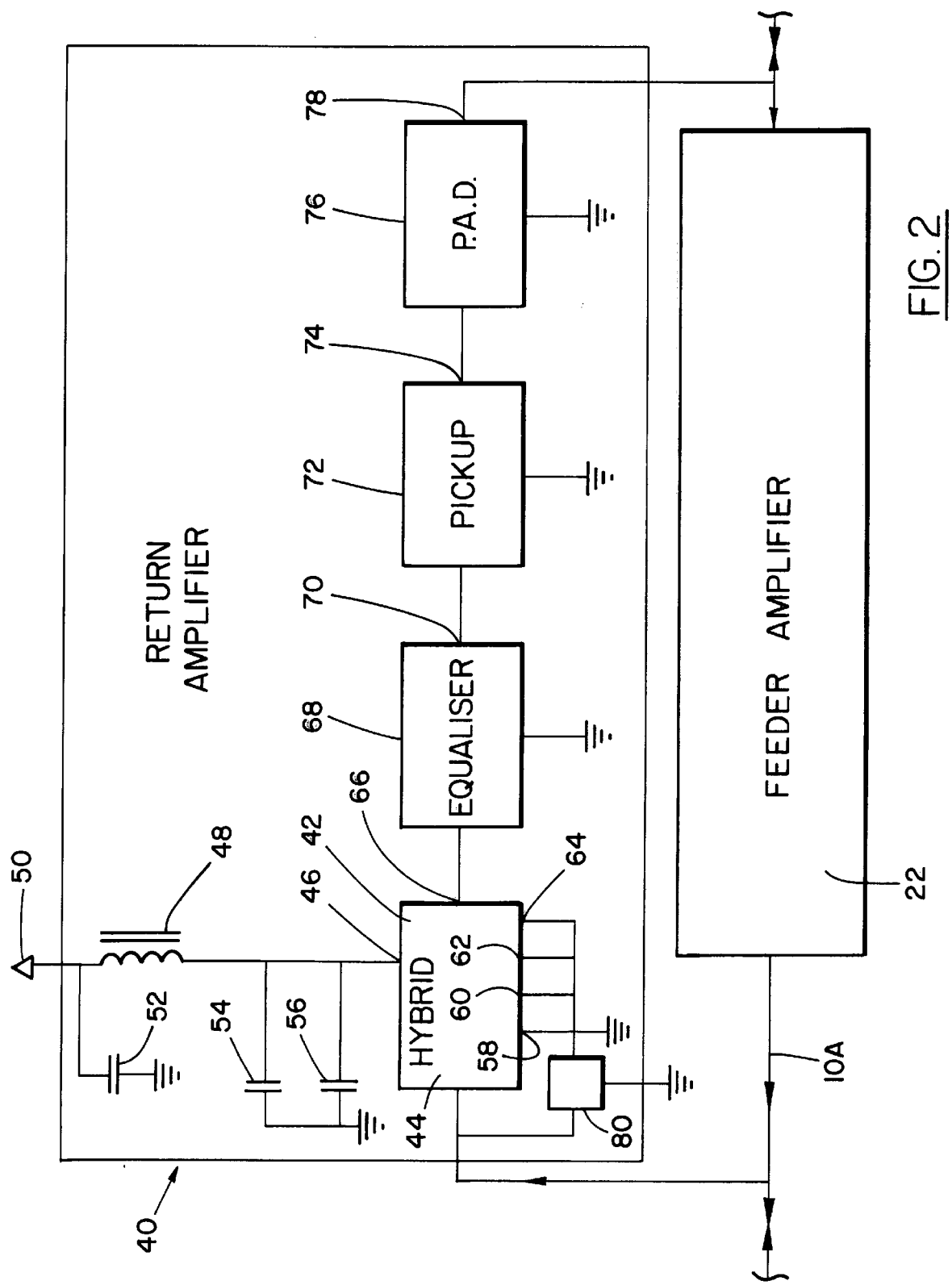
FIG. 2 is a block circuit diagram of a return amplifier illustrating the principles of the invention; and, FIG. 3 is a detailed block circuit diagram of a return amplifier further illustrating the principles of the invention.
Figure 3:
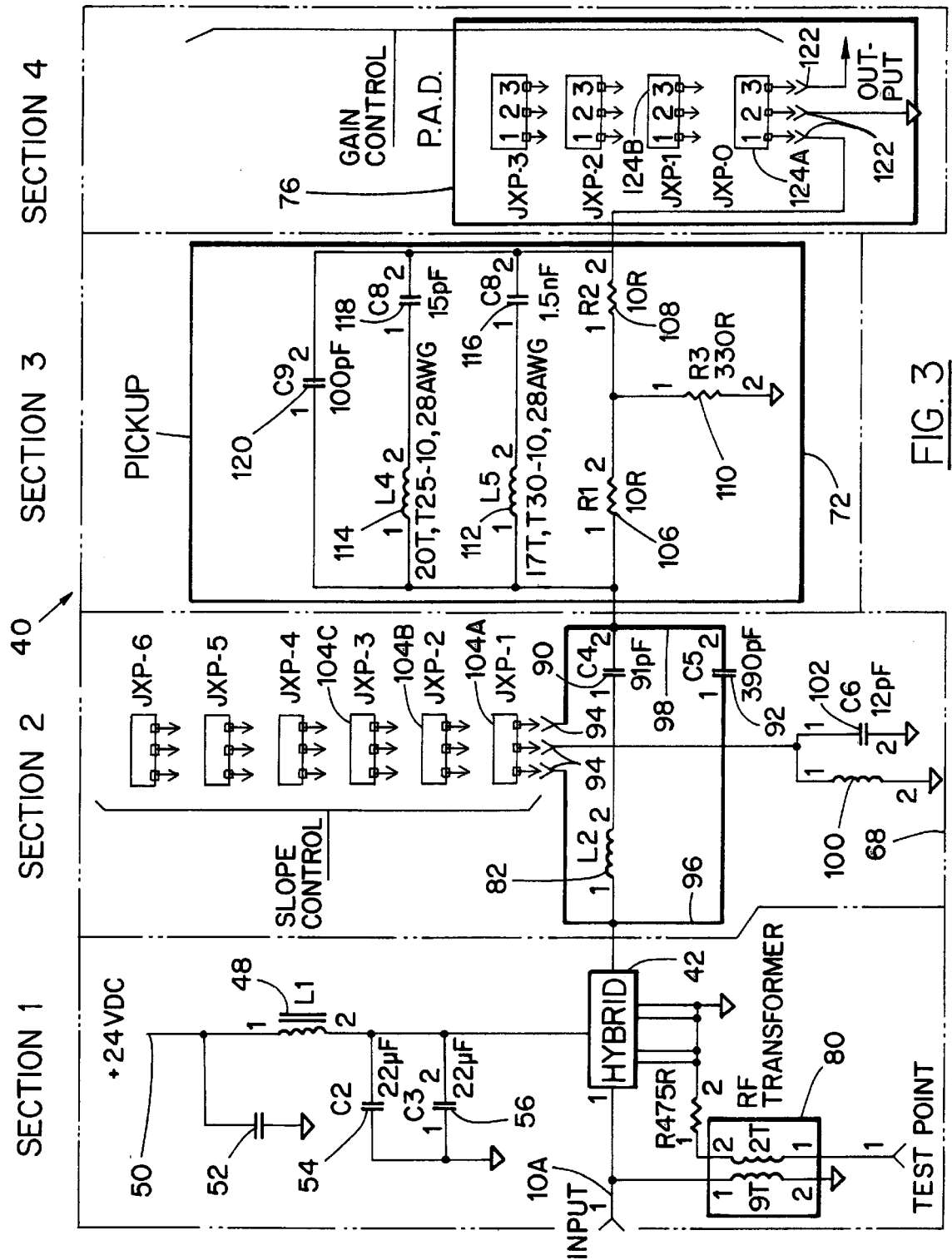

This amplification and equalization of the amplified return signal frequencies is achieved in the manner shown in FIGS. 2 and 3.

Referring now to FIG. 2, the return amplifier 40, which it will be noted is connected to cable 10 on the input and output ends of the feeder amplifier 22, comprises a gain block amplifier processor chip 42, having nine terminals. Terminal 44 is connected to the cable 10A downstream of feeder amplifier 22, so as to receive return signals flowing back along cable 10A from, for example, a personal computer P or other signal source, capable of sending return signals along the coaxial cable system 10. Terminal 46 is connected via a choke 48 to a power source 50. Capacitors 52, 54 and 56 are connected between the power source 50 and the gain block amplifier chip 42.

Terminals 58, 60, 62 and 64 of gain block amplifier chip 42 are connected to ground. Terminal 66 is connected, so as to pass signals from chip 42 to equalizer 68. Equalizer circuit 68 is in turn connected at connection 70 to Pick up circuit 72. Pick up 72 is in turn connected at connection 74 to plug in aftenuator circuit 76. Plug in attenuator circuit 76 is in turn connected via connector 78 back to the cable 10, upstream of the feeder amplifier 22. In addition, the transformer 80 is connected between connections 58, 60, 62 and 64, and the input 10A. In this way return signals passing back up the cable system are amplified and equalized. Referring now to FIG. 3 the return amplifier 40 is shown in more detail.

As already explained, the return amplifier at its input end (left-hand end of FIG. 3), comprises a gain block amplifier 42 having nine terminals, and connected to a power supply 50, through choke 48, and modified by capacitors. A transformer 80 is also connected between the main input line 10A and the four lower terminals 58, 60, 62 and 64 of the gain block amplifier.

From the gain block amplifier 42, the return signals pass to the equalizer 68. The equalizer 68 comprises an inductor 82, and a capacitor 90 and a further capacitor 92.

There are three plug in terminals 94, 94, 94. The outer two terminals are connected via connections 96, 98, through capacitor 92 and then to ground through inductor 100 and capacitor 102.

The central terminal 94 is connected directly through to inductor 100 and capacitor 102.

There are a plurality of attenuator modules 104A, B, C, etc., each having three plug in pins, which are adapted to be received in the three plug in sockets 94. The attenuator modules each have different values, providing different levels of attenuation. By selecting the appropriate attenuation module, the desired characteristics of the return amplifier 40 can be preset for the particular location in the cable system 10.

From the equalizer 68, the signal goes to the pick up circuit 72. The pick up circuit 72 comprises a three-way arrangement of resistors 106, 108 and 110, with resistor 110 being connected between resistors 106 and 108, and being connected to ground.

In parallel with resistors 106 and 108, there are provided a pair of inductors 112 and 114 each connected to respective capacitors 116 and 118. A third capacitor 120 is connected in parallel with the two inductor capacitor circuits.

From the pick up 72, the signals pass to a plug in attenuator circuit 76. This circuit simply consists of three plug receiving sockets 122, the centre socket being connected to ground.

FIG. 3 has been divided into four sections "1", "2", "3", and "4" and the following is a brief but concise description of the purpose and operation of each section.

SECTION "1"

The principal purpose of this section is to provide a flat linear gain across the band of interest in the frequency spectrum 5 to 42 Megahertz. Gain is accomplished through the use of a push-pull amplifier hybrid consisting of two single-ended transistor circuits working together so that one single-ended circuit amplifies only during the negative part of the cycle. Although this configuration requires two transistor circuits instead of one for every amplifier stage, it does reduce harmonic distortion significantly and thus can simultaneously amplify, with acceptable distortion, a larger number of signals than can one single-ended stage transistor working alone. The push-pull stages are then re-combined into a single output signal. The scheme of running push-pull circuits in parallel allows each stage to operate at a lower level and thus to produce less distortion for a given input and gain than one push-pull stage.

The +24 VDC port derives voltage from a power supply external to the return amplifier but is part of the complete trunk or line extender station. Additional DC voltage filtering is accomplished by employing four additional components L1, C1, C2 and C3.

The hybrid is driven by analog or digital signals at the input port of the return amplifier and usually comes from local sources or further in the cable television system.

The test point port provides for the testing of input levels to the return amplifier. This test port is well isolated from input, through the use of the RF transformer and R4 so that accurate input signal level readings can be made while not interfering with the main signal during the reverse amplifier operation.

SECTION "2"

The principal purpose of this section is to provide for a means of adjusting the output of the amplifier to compensate for cable characteristics through the use of a slope control. Cable characteristics can be calculated by the simple formula of . . .

Cable Loss Ratio=square root of $f1/f2 \times$ attenuation

Where

| f1 | unknown frequency |
|----|-------------------|
| f2 | known frequency | attenuation 32 known f2 frequency attenuation at a desired length. Through the use of common inductive and capacitive circuits represented by L2 and C4 and C5 and L3 and C6 and a plurality of attenuators known as PADS the output of the return amplifier can be adjusted to emulate the cable characteristics. Three round pin sockets are provided on the printed circuit board to allow for the easy change of the PAD devices by either field technicians or bench technicians. PAD devices are available in one-half decibel steps to provide for greater versatility when very accurate system adjustments are demanded by the system design engineers. The drawing only shows one-decibel steps eg. JXP-1, JXP-2 etc. for the purpose of simplicity.

SECTION "3"

The main purpose of these circuits is to provide shaping of the frequency response at both 5 Megahertz and 42 Megahertz through the use of a pick up circuit. The need to provide a pick up at 5 Megahertz is make up for the roll-off in the frequency response inherent in the design and manufacture of the hybrid amplifiers produced primarily by the Motorola and Phillips corporations. The need to provide a pick up circuit at 42 Megahertz is to make up for the roll-off in the frequency response that is inherent in the design and manufacture of the diplex filter designs.

SECTION "1"

The main purpose of circuit is to provide a means of accepting plug in PADS to attenuate the output level or signal. This circuit is designed to adjust the amplifiers flat loss across the frequency band of interest 5 to 42 Megahertz. Three round pin sockets are provided on the printed circuit board to allow for the easy change out of the PAD devices by either field technicians or bench technicians. PAD devices are available in one-half decibel steps to provide for greater versatility when very accurate system adjustments are demanded by the system design Engineers. Note that the drawing only shows one-decibel steps eg. JXP-1, JXP-2 etc. for the purpose of simplicity.

A plurality of plug in attenuator modules 124A, 124B etc. provided with suitable plug in pins are adapted to be plugged in to the sockets 122. In this way the performance characteristics of the entire return amplifier 40 can be set to the desired performance for the particular location in the cable network.

It will thus be seen that by use of the teaching of the invention, it is possible for a complete cable distribution network 10 to be used for providing two-way signals such as signals used on the Internet system, by means of which the feed signals pass through the conventional amplifiers 22, on their way to the subscribers, and the return signals pass through the return amplifiers 40. in this way, the Internet server when receiving return signals from the customers or subscribers will receive signals at an appropriately amplified level, with the signal strengths across the entire frequency range being equalized, so as to ensure satisfactory transfer of all information.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A return amplifier for two-way coaxial cable systems, having a distribution centre distributing first feed signals, and a plurality of coaxial cable lines extending therefrom, and a plurality of tap ports connecting signals from the coaxial cable line to respective terminals, and said coaxial cable system further having a separate second signal delivery system having facilities for distributing second feed signals onto said coaxial cable system and having reception facilities for receiving return second signals from said coaxil cable system, and wherein first and second feed signals and return second signals passing along said coaxial cable system in opposite directions are progressively attenuated in signal strength, said coaxial cable system having feeder amplifiers at spaced intervals there along, for receiving first and second feed signals passing along said coaxial cables, and amplifying the same, the return amplifier comprising;

a standard amplifier assembly having a plurality of electronic circuits, and in which first and second said electronic circuits of said plurality of electronic circuits are setable to provide varying amplifier specifications, and each of said first and second electronic circuits having receptacles for receiving plug in circuit components for varying specifications of respective said first and second electronic circuits, and, a plurality of plug in attenuator components for said first and second electronic circuits, each of said attenuator components being of identical design and said plurality of attenuator components having a range of performance characteristics and being adapted to inter-fit with either said first or said second electronic circuit interchangeably, and said attenuator components having a range of varying performance characteristics whereby a respective said attenuator component can be selected and plugged in to respective one of said first and second electronic circuits to produce the performance specifications desired for the return amplifier at a predetermined location along said coaxial cable system.

2. A return amplifier as claimed in claim 1 and in which the return amplifier incorporates an equalizer circuit, said equalizer circuit being adapted to receive one of a plurality of plug in attenuator components having characteristics which are predetermined, whereby the characteristics of said return amplifier can be adjusted, by interchanging a said attenuator component in said equalizer circuit.

3. A return amplifier as claimed in claim 2 having a plurality of interchangeable attenuator components having predetermined characteristics, whereby a service person may install such a return amplifier, and may set its predetermined characteristics, by inserting attenuator components having the respective characteristics required for that particular location of that particular return amplifier in a cable system.

4. A return amplifier as claimed in claim 2 wherein said return amplifier incorporates a PAD circuit adapted to receive one of a plurality of plug in attenuator components, wherein the plug in attenuator components for the equalizer circuit, and for the PAD circuit, are all of identical design, and are interchangeable between the equalizer circuit and the PAD circuit.

5. A return amplifier as claimed in claim 4 and further including a gain block amplifier circuit.

6. A return amplifier as claimed in claim 5 and further including a pick up circuit, said pick up circuit being located between said attenuator components and said PAD circuit, and said gain block amplifier circuit being located between said attenuator circuit and the input to said return amplifier.

7. A return amplifier as claimed in claim 6 wherein said return amplifier is adapted to be connected to a coaxial cable system around a respective said feed amplifier, whereby feed signals can pass through said feed amplifier in a feed direction, and return signals can pass through said return amplifier around said feed amplifier in a return direction.

8. A method of operating a return amplifier for two-way coaxial cable systems, having a distribution centre distributing first feed signals, and a plurality of coaxial cable lines extending therefrom, and a plurality of tap ports connecting signals from the coaxial cable line to respective terminals, and a coaxial cable system further having a separate second signal delivery system having facilities for distributing second feed signals onto said cable system and having reception facilities for receiving return second signals from said cable system, and wherein first and second feed signals and return second signals passing along coaxial cable system in opposite directions are progressively attenuated in signal strength, said coaxial cable system having feeder amplifiers at spaced intervals there along, for receiving first and second feed signals passing along said coaxial cables, and amplifying the same, the return amplifier comprising the steps of;

passing return signals through a standard amplifier assembly having a plurality of electronic circuits, and in which first and second said electronic circuits of said plurality of electronic circuits are setable to provide varying amplifier specifications dependent on the strength of return signals and each of said first and second electronic circuits having receptacles for receiving plug in circuit components for varying said specifications, of respective said first and second electronic circuits, and, passing return signals through respective first and second plug in attenuator components in said first electronic circuit, and subsequently in said second electronic circuit, said first and said second plug in attenuator components being of identical design and having performance characteristic specific for return signals and being adapted to inter-fit with either said first or said second electronic circuit interchangeably, whereby a respective said plug in attenuator component can be selected and plugged in to respective one of said first and second electronic circuits to produce the performance specifications specific for return signals desired for the return amplifier at a predetermined location along a coaxial cable system.

9. A method as claimed in claim 8 and further including the steps of passing return signals through an equalizer circuit, said equalizer circuit being adapted to receive one of a plurality of plug in attenuator components having characteristics which are predetermined for return signals, whereby the characteristics of the amplifier can be adjusted, by interchanging said plug in attenuator component in said equalizer circuit.

10. A method as claimed in claim 9 and including the steps of passing return signals through a PAD circuit adapted to receive one of a plurality of plug in attenuator components, wherein the plug in attenuator components for the equalizer circuit, and for the PAD circuit, are all of identical design, and are interchangeable between the equaliser circuit and the PAD circuit.

11. A method as claimed in claim 10 and further including the steps of passing return signals through a gain block amplifier circuit.

12. A method as claimed in claim 11 and wherein said return amplifier is connected to a coaxial cable system around a respective said feed amplifier, whereby feed signals can pass through said feed amplifier in a feed direction, and including the steps of passing return signals through said return amplifier around said feed amplifier in a return direction.

\* \* \* \* \*